United States Patent
Lefort et al.

(10) Patent No.: US 11,146,044 B2
(45) Date of Patent: Oct. 12, 2021

(54) FILLER PLATE, LOADCENTER AND METHOD FOR COVERING AN OPENING IN A DEADFRONT OF A LOADCENTER

(71) Applicant: ABB Schweiz AG, Baden (CH)

(72) Inventors: Maxime Lefort, Longueuil (CA); Daniel Lalancette, Saint-Jean-sur-Richelieu (CA); Audrey Bellefeuille, Longueuil (CA); Frederick Piche, Granby (CA)

(73) Assignee: ABB SCHWEIZ AG, Baden (CH)

( * ) Notice: Subject to any disclaimer, the term of this patent is extended or adjusted under 35 U.S.C. 154(b) by 564 days.

(21) Appl. No.: 16/035,285

(22) Filed: Jul. 13, 2018

(65) Prior Publication Data

US 2020/0021087 A1 Jan. 16, 2020

(51) Int. Cl.
*H02B 1/38* (2006.01)
*H02B 3/00* (2006.01)

(52) U.S. Cl.
CPC ............... *H02B 1/38* (2013.01); *H02B 3/00* (2013.01)

(58) Field of Classification Search
CPC . B65D 55/16; H02B 1/38; H02B 3/00; H05K 5/03
USPC .............. 220/242, 3.8, 4.02, 817, 379, 802
See application file for complete search history.

(56) References Cited

U.S. PATENT DOCUMENTS

| | | | | |
|---|---|---|---|---|
| 2,559,151 A * | 7/1951 | Getzoff | ............... | H01R 13/447 |
| | | | | 439/136 |
| 2,808,175 A * | 10/1957 | Aiken | ..................... | A47J 36/10 |
| | | | | 220/379 |
| 3,743,892 A | 7/1973 | Fritz et al. | | |
| 4,472,761 A | 9/1984 | Koslosky et al. | | |
| 4,791,525 A | 12/1988 | Grass et al. | | |
| 5,207,023 A * | 5/1993 | Forsberg | .................. | E05D 1/04 |
| | | | | 49/256 |
| 5,294,169 A * | 3/1994 | Roy | ........................ | B62D 25/24 |
| | | | | 220/3.5 |
| 6,547,348 B2 | 4/2003 | Craft et al. | | |
| 8,360,269 B1 * | 1/2013 | Chang | .................... | B65D 45/20 |
| | | | | 220/817 |
| 8,902,570 B2 * | 12/2014 | Cosley | ..................... | H02B 1/42 |
| | | | | 361/632 |
| 9,742,161 B2 | 8/2017 | Sharp | | |
| 9,859,692 B1 | 1/2018 | Lalancette et al. | | |
| 2008/0149467 A1 * | 6/2008 | Somalingayya | ....... | H01H 9/286 |
| | | | | 200/50.33 |
| 2009/0083942 A1 * | 4/2009 | Sellati | ...................... | E05F 7/04 |
| | | | | 16/294 |

* cited by examiner

*Primary Examiner* — J. Gregory Pickett
*Assistant Examiner* — Niki M Eloshway
(74) *Attorney, Agent, or Firm* — Greenberg Traurig, LLP

(57) ABSTRACT

A filler plate for a loadcenter having an opening in a deadfront includes a cover plate constructed to cover the opening; a first leg coupled to and spaced apart from the cover plate to yield a first gap between the first leg and the cover plate, wherein the first gap is constructed to receive a first portion of the deadfront adjacent to the opening therein; and a second leg coupled to and spaced apart from the cover plate to yield a second gap between the second leg and the cover plate, wherein the second gap is constructed to receive a second portion of the deadfront adjacent to the opening therein.

20 Claims, 5 Drawing Sheets

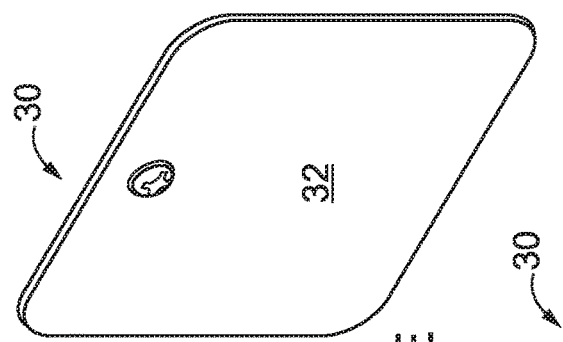
FIG. 3E
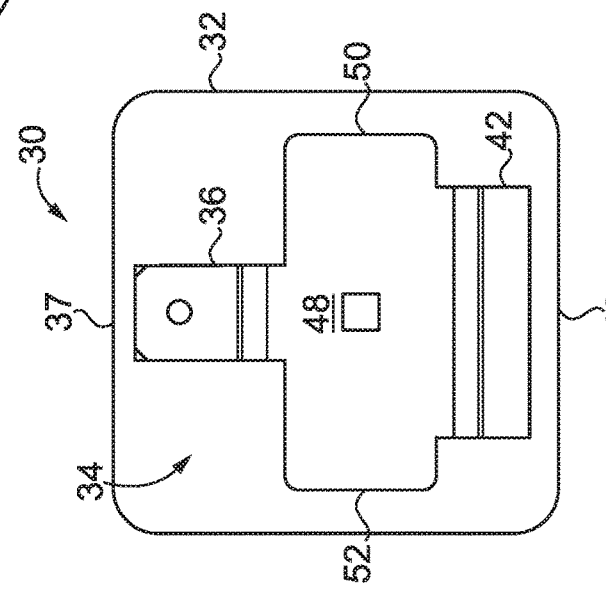
FIG. 3C
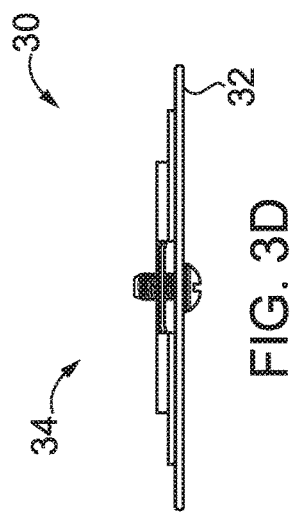
FIG. 3D
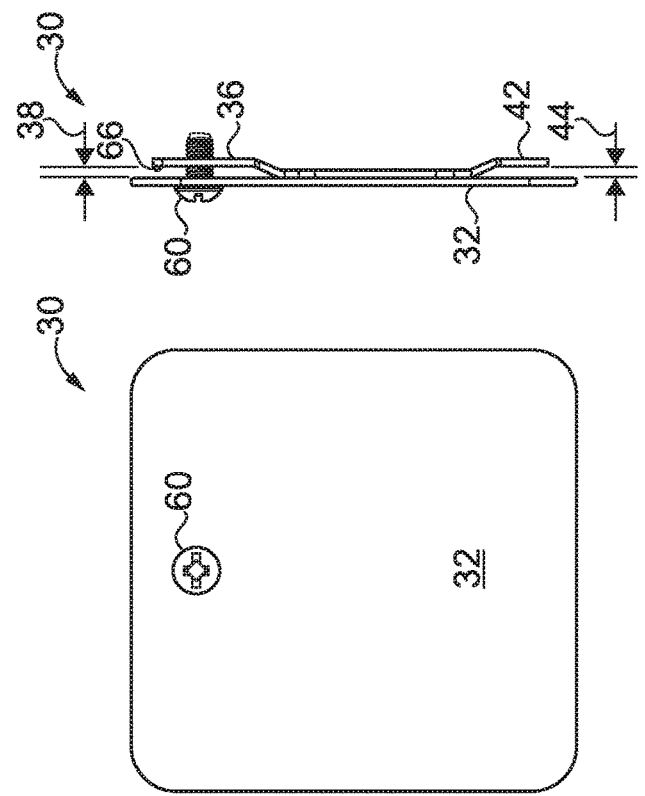
FIG. 3B
FIG. 3A

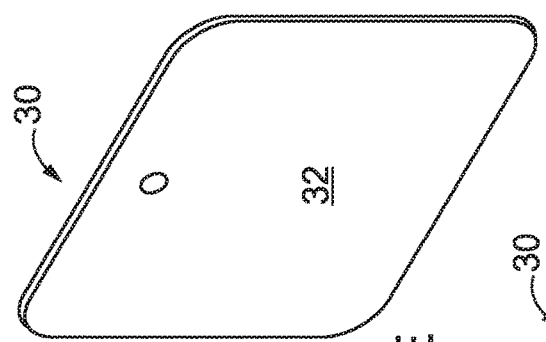
FIG. 4E
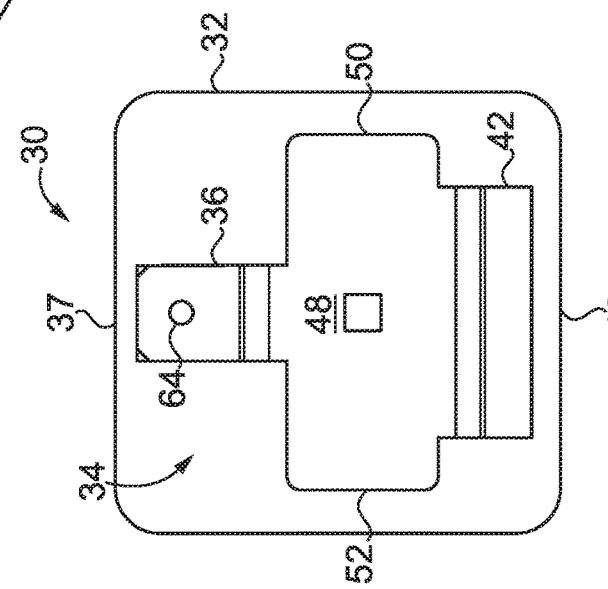
FIG. 4C
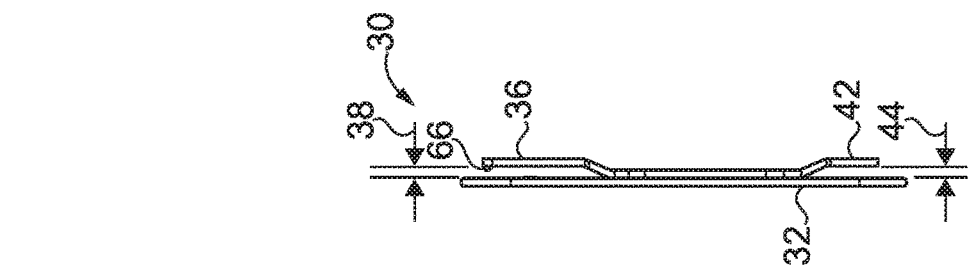
FIG. 4B
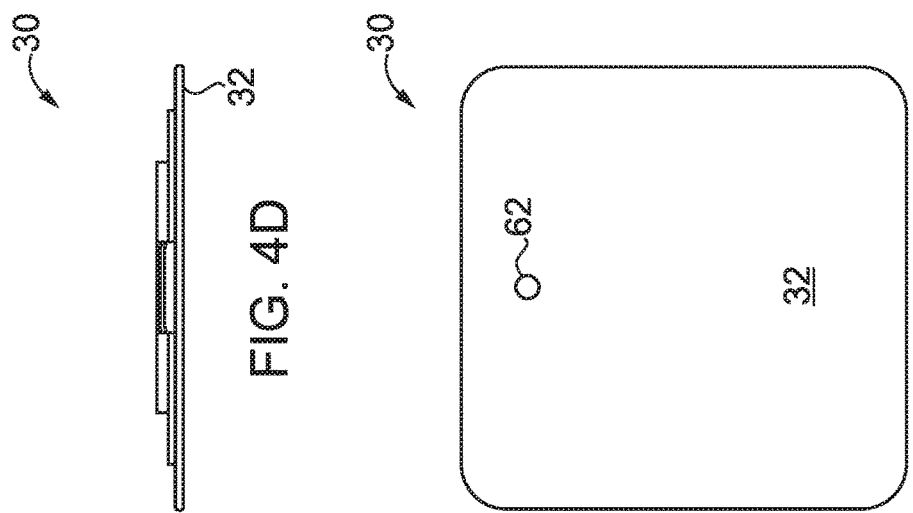
FIG. 4D
FIG. 4A

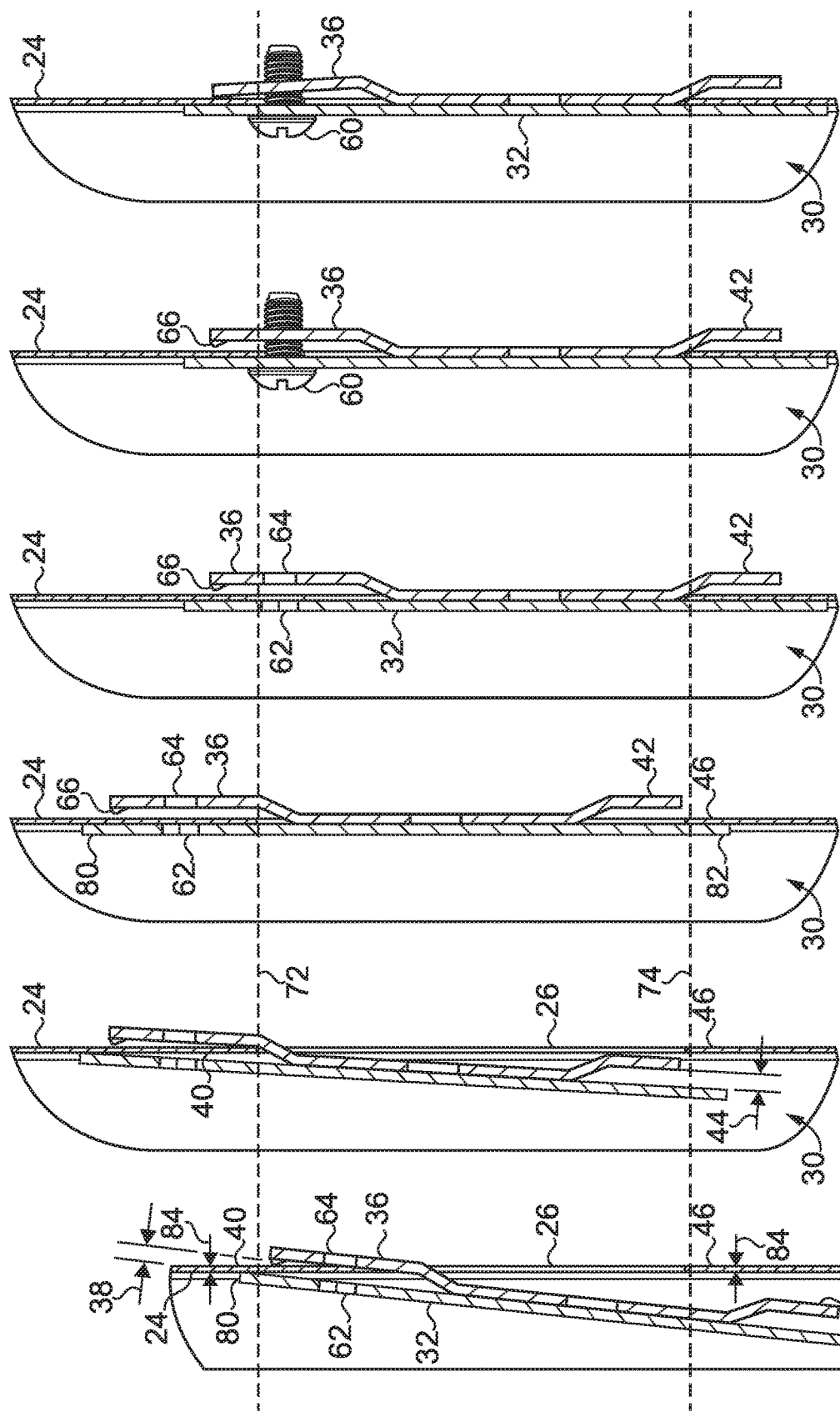

FILLER PLATE, LOADCENTER AND METHOD FOR COVERING AN OPENING IN A DEADFRONT OF A LOADCENTER

TECHNICAL FIELD

The present application relates generally to a loadcenter and more particularly, but not exclusively, to a filler plate and method for covering an opening in a deadfront of a loadcenter.

BACKGROUND

Electrical systems remain an area of interest. Some existing systems have various shortcomings, drawbacks and disadvantages relative to certain applications. For example, in some loadcenter and filler plate configurations, the assembly of the filler plate onto the loadcenter may require drilling or machining of the loadcenter. Accordingly, there remains a need for further contributions in this area of technology.

SUMMARY

One embodiment of the present invention is a unique filler plate. Another embodiment is a unique loadcenter. Another embodiment is a unique method for covering an opening in a deadfront of a loadcenter. Other embodiments include apparatuses, systems, devices, hardware, methods, and combinations for loadcenters and filler plates therefor. Further embodiments, forms, features, aspects, benefits, and advantages of the present application shall become apparent from the description and figures provided herewith.

BRIEF DESCRIPTION OF THE FIGURES

The description herein makes reference to the accompanying drawings wherein like reference numerals refer to like parts throughout the several views, and wherein:

FIG. 3A-3E illustrate some aspects of a non-limiting example of a filler plate in accordance with an embodiment of the present invention.

FIGS. 4A-4E illustrate some aspects of a non-limiting example of the filler plate of FIGS. 3A-3E with the attachment screw removed for clarity.

FIGS. 5A-5F illustrate some aspects of a non-limiting example of some steps for installing a filler plate in accordance with an embodiment of the present invention.

DETAILED DESCRIPTION OF THE ILLUSTRATIVE EMBODIMENTS

Figure 1:
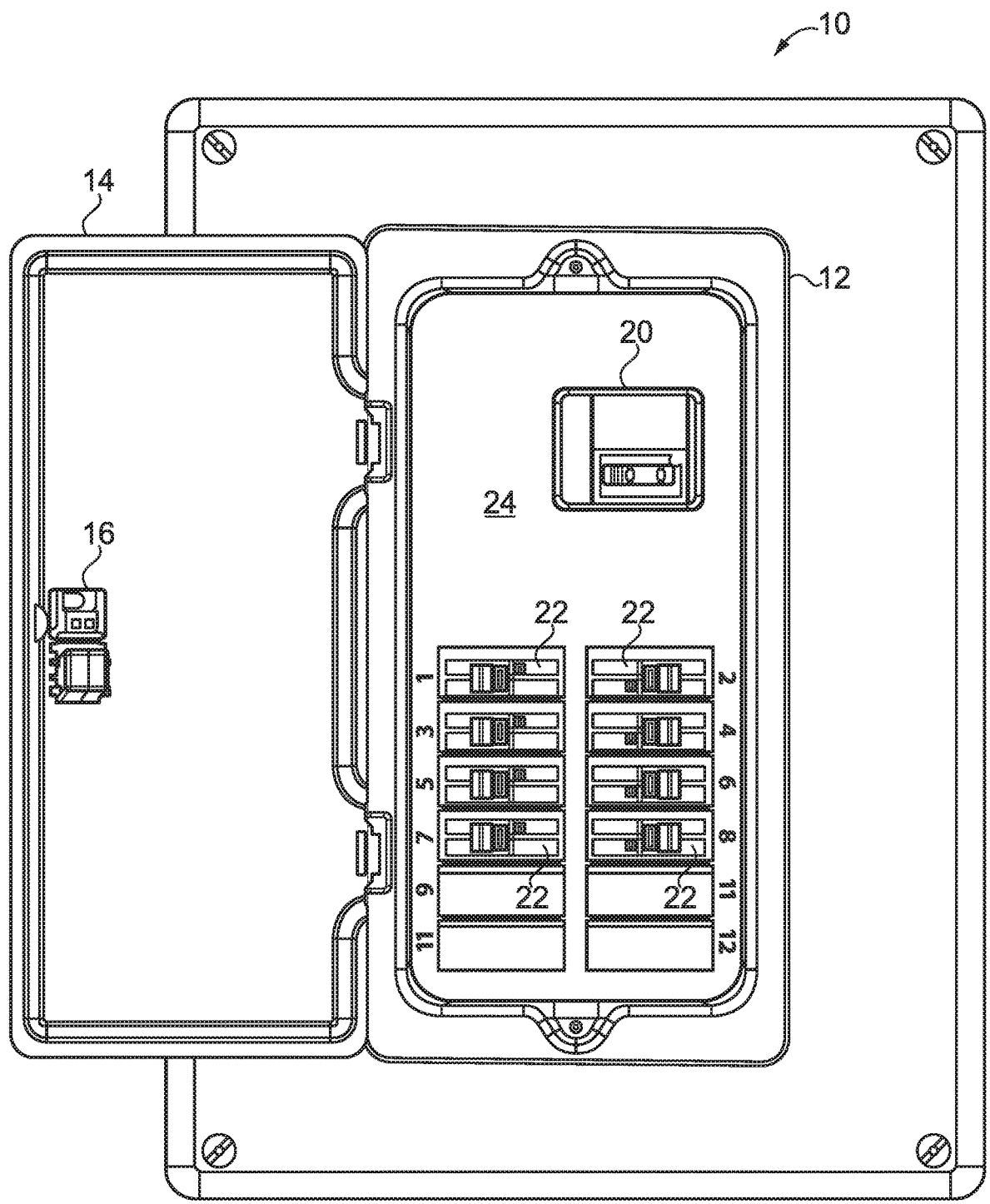
FIG. 1 illustrates some aspects of a non-limiting example of a loadcenter in accordance with an embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

Referring to FIG. 1, some aspects of a non-limiting example of a loadcenter 10 in accordance with an embodiment of the present invention is illustrated. In one form, loadcenter 10 is a residential loadcenter. In other embodiments, loadcenter 10 may be a commercial or industrial loadcenter. Loadcenter 10 includes a control panel 12 with a hinged door 14 having a latch mechanism 16. Control panel 12 includes a main breaker 20, a plurality of branch breakers 22, and a deadfront shield or deadfront 24 constructed to shield users from the live wires and other live components or elements contained within control panel 12.

Figure 2:
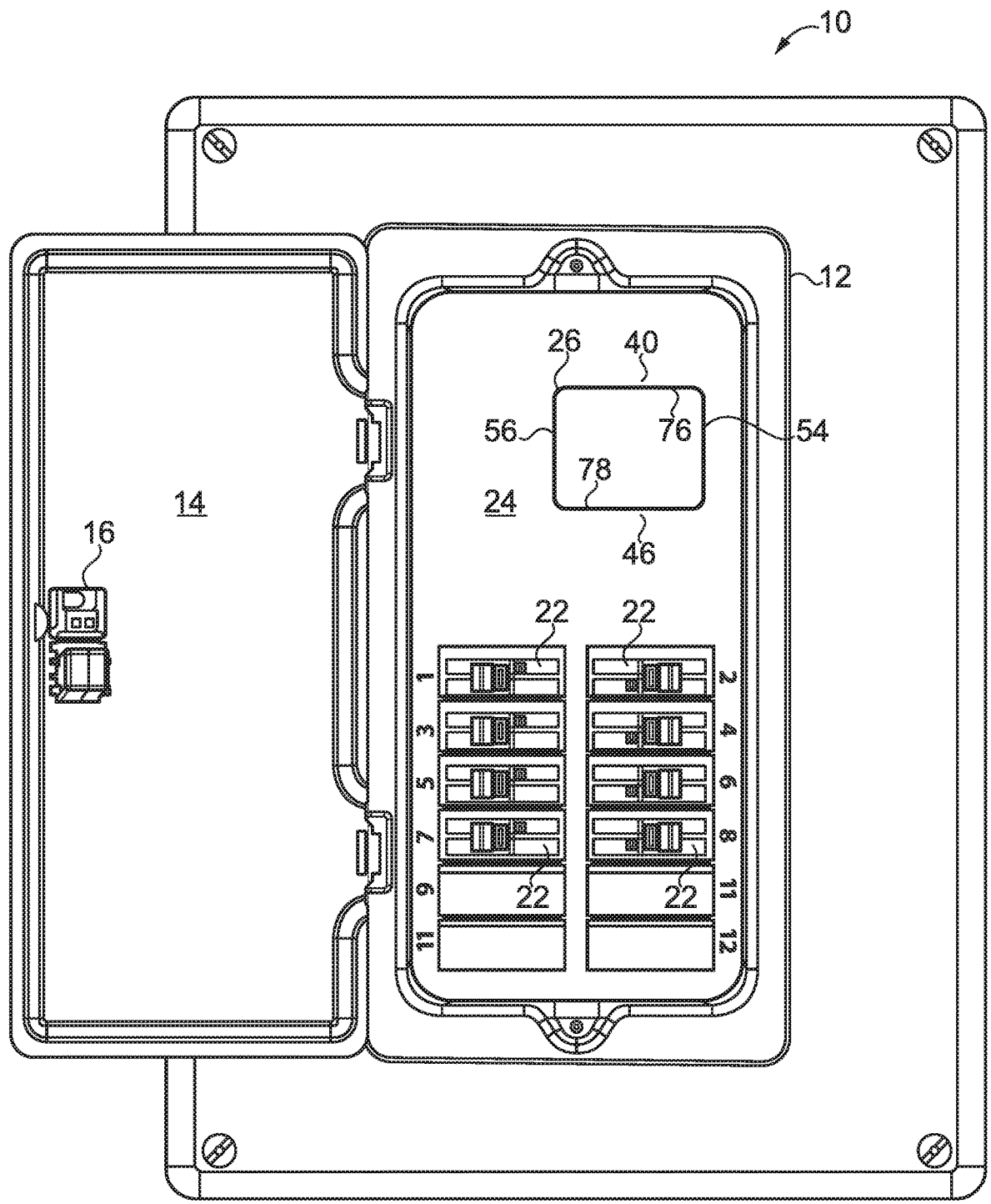
FIG. 2 illustrates some aspects of the loadcenter of FIG. 1 with a main breaker removed.

Referring also to FIG. 2, in some circumstances, it may be desirable to remove a breaker, e.g., remove a main breaker 20 (shown inn FIG. 1), or to set up a loadcenter without one or more breakers, e.g., without a main breaker 20, in which case it is desirable to protect human users or operators from the live wires and other live components or elements disposed within control panel 12 behind deadfront 24, which may be inadvertently accessed through the opening 26 in deadfront 24 intended for the breaker, e.g., main breaker 20. Accordingly, a filler plate may be employed to cover opening 26 and prevent accidental access to live wires and other components or elements disposed behind deadfront 24.

Referring also to FIGS. 3A-3E and FIGS. 4A-4E, some aspects of a non-limiting example of a filler plate 30 for covering opening 26 are illustrated. FIGS. 4A-4E illustrate the filler plate 30 of FIGS. 3A-3E, but without the attachment screw 60, which has been removed from FIGS. 4A-4E for clarity of illustration. FIGS. 3A and 4A are front views, FIGS. 3B and 4B are side views, FIGS. 3C and 4C are back views, FIGS. 3D and 4D are top views, and FIGS. 3E and 4E are front perspective views. Filler plate 30 includes a cover plate 32 and an attachment feature 34. Cover plate 32 is constructed to cover opening 26. Attachment feature 34 is constructed to position filler plate 30 over opening 26 so that cover plate 32 completely covers opening 26 in deadfront 24. Attachment feature 34 is affixed to cover plate 32, e.g., by welding and/or other attachment schemes. Attachment feature 34 is electrically coupled to cover plate 32.

Attachment feature 34 includes a leg 36. In one form, leg 36 is disposed adjacent to an end 37 of cover plate 32. In other embodiments, one or more legs 36 may also or alternatively be disposed at one or more other locations. Leg 36 is coupled to and spaced apart from cover plate 32 to yield a gap 38 between the leg 36 and cover plate 32. Gap 38 is constructed to receive a portion 40 of deadfront 24 therein. Portion 40 may be adjacent to opening 26.

Attachment feature 34 also includes a leg 42. In one form, leg 36 is longer than leg 42. In other embodiments, leg 42 may be longer than leg 36 or may have the same length as leg 46. Leg 42 is disposed adjacent to end 43 of cover plate 32 opposite end 37. In other embodiments, one or more legs 42 may also or alternatively be disposed at one or more other locations. Leg 42 is coupled to and spaced apart from cover plate 32 to yield a gap 44 between the leg 42 and cover plate 32. Gap 44 is constructed to receive a portion 46 of the deadfront 24 therein. Portion 46 may be adjacent to opening 26. In one form, leg 42 is disposed on the opposite side of filler plate 30 than is leg 36, and portion 46 is disposed on the opposite side of opening 26 than is portion 40. In other embodiments, legs 36 and 42, and portions 40 and 46 may be disposed at any other suitable locations. Attachment feature 34 also includes a location feature 48. Location feature 48 is constructed to position cover plate 32 over opening 26. Location feature 48 includes two sides 50, 52 constructed to engage and fit between at least two sides 54, 56 of opening 26 to position cover plate 32 over opening 26.

For example, the width of location feature 48, e.g., the distance between the two sides 50 and 52, may be made slightly smaller than the width of opening 26 between sides 54 and 56 to ensure desirable positioning of cover plate 32 over opening 26. For example, the distance between the two sides 50 and 52 of location feature 48 may be 0.25 mm to 1.5 mm or some other amount smaller than the width of opening 26 between sides 54 and 56 of opening 26.

Leg 36 is constructed to deform, i.e., to be deformed, and reduce the first gap and clamp or pinch portion 40 of deadfront 24 between the leg 36 and cover plate 32. A fastener 60 is constructed to engage leg 36 and to deform the leg 36 to reduce gap 38 and clamp or pinch portion 40 of deadfront 24 between leg 36 and cover plate 32. In particular, threaded fastener 60 and leg 36 are constructed to engage each other and cooperate to deform leg 36 to reduce gap 38 and clamp or pinch portion 40 of deadfront 24 between leg 36 and cover plate 32 upon the application of a predetermined amount of torque to threaded fastener 60. The amount of torque may vary with the needs of the application. Cover plate 32 includes an opening 62 constructed to receive fastener 60. In one form, fastener 60 is a threaded fastener constructed to threadingly engage leg 36, e.g., via an opening or hole 64 in leg 36 constructed to threadingly receive fastener 60. Opening 64 may be a threaded opening constructed to threadingly engage a threaded fastener 60, for example. As another example, opening 64 may not be threaded, and may be constructed to threadingly engage a self-threading fastener 60, such as a self-threading screw, for instance, a non-cutting self-threading screw that does not generate metal shavings while forming threads in opening 64. In other embodiments, fastener 60 and/or opening 64 may take other forms.

Leg 36 is electrically coupled to cover plate 32 and constructed to ground cover plate 32 with deadfront 24, e.g., with portion 40 of the deadfront 24. In some embodiments, leg 36 includes one or more teeth or protrusions 66 extending therefrom and constructed to engage and ground leg 36 with portion 40 of the deadfront 24. For example, protrusions 66 may extend from leg 36 at right angles from leg 36, extending in a direction toward portion 40 of deadfront 24 when filler plate 30 is in the installed position. Protrusions 66 are constructed to 'bite' into or 'dig' into portion 40 of deadfront 24 and penetrate any oxidation layer or coating or paint or other surface treatment of portion 40 of deadfront 24 to electrically couple leg 36 with portion 40 of deadfront 24, e.g., upon the application of a sufficient or predetermined amount of torque applied to fastener 60.

Referring to FIGS. 5A-5F, some aspects of a non-limiting example of a method for installing filler plate 30 are depicted in side cross-sectional views of filler plate 30 and deadfront 24 with opening 26 in accordance with an embodiment of the present invention. Dashed lines 72 and 74 indicate the location of edges 76 and 78 of opening 26 adjacent to respective portions 40 and 46 of deadfront 24 throughout the views of FIGS. 5A-5F. As illustrated in FIG. 5A, the installation of filler plate 30 may start with the insertion of leg 36 into opening 26, with end 80 of cover plate 32 resting against the exterior of deadfront 24. Filler plate 30 is then slid in a direction toward leg 36, while simultaneously, end 82 of cover plate 32 is pushed toward deadfront 24, and portion 40 of deadfront 24 is received into gap 38 between leg 36 and cover plate 32. Deadfront 24 has a wall thickness 84 at adjacent to opening 26, e.g., at portions 40 and 46 of deadfront 24. Gaps 38 and 44 are constructed to receive wall thickness 84 of deadfront 24 opening 26.

As filler plate 30 is slid upward, portion 40 is further received into gap 38, and the end of leg 42 moves past end 78 of opening 26, as illustrated in FIG. 5B. End 82 of filler plate 30 is pushed toward and contacts deadfront 24, with leg 42 being inserted into and received into opening 26, as illustrated in FIG. 5C. Filler plate 30 is then slid in a direction toward leg 42, e.g., until edge 78 of opening 26 contacts leg 42 adjacent to the point where leg 42 contacts cover plate 32, wherein portion 46 of deadfront 24 is received into gap 44. In some embodiments, the portion of leg 42 adjacent to the point where leg 42 contacts cover plate 32 functions as a location feature for positioning cover plate 32 over opening 26. For example, the contact between edge 78 of opening 26 with the portion of leg 42 adjacent to the point where leg 42 contacts cover plate 32 may position cover plate 32 in a desired vertical position over opening 26.

Leg 36 is then clamped against deadfront 24. For example, in the illustrated embodiment, fastener 60 is inserted into opening 62, through opening 26, and is threaded into threaded hole 64 in leg 36. Fastener 60 functions as a location feature for positioning cover plate 32 over opening 26. For example, the proximity of the installed fastener 60 to edge 76 of opening 26 ensures that the desired vertical positioning of cover plate 32 over opening 26 is maintained. Notably, this construction in some embodiments does not require a separate hole to be drilled into deadfront 24 to install fastener 60, thus eliminating the necessity of drilling a hole into deadfront 24, and eliminating the potential entry of metal chips into loadcenter 10, which could cause a short circuit inside loadcenter 10.

Torque, e.g., a predetermined amount of torque, is then applied to fastener 60 to deform leg 36 and clamp or pinch portion 40 of deadfront 24 between leg 36 and cover plate 32. The torque drives protrusion(s) 66 of leg 36 into the back side of deadfront 24 to electrically couple and ground filler plate 30 with deadfront 24. It will be understood that although depicted as being installed in a particular orientation in the drawings where fastener 60 is disposed at the top of opening 26, in other embodiments, filler plate 30 may be installed in other orientations, e.g., upside-down relative to the depicted installation or rotated 90 degrees in the clockwise or counterclockwise directions.

Embodiments of the present invention include a filler plate for a loadcenter having an opening in a deadfront, comprising: a cover plate constructed to cover the opening; a first leg coupled to and spaced apart from the cover plate to yield a first gap between the first leg and the cover plate, wherein the first gap is constructed to receive a first portion of the deadfront adjacent to the opening therein; and a second leg coupled to and spaced apart from the cover plate to yield a second gap between the second leg and the cover plate, wherein the second gap is constructed to receive a second portion of the deadfront adjacent to the opening therein.

In a refinement, the first leg is constructed to deform and reduce the first gap and clamp the first portion of the deadfront between the first leg and the cover plate.

In another refinement, the filler plate further comprises a fastener constructed to engage the first leg and to deform the first leg to reduce the first gap and clamp the first portion of the deadfront between the first leg and the cover plate.

In yet another refinement, the fastener is a threaded fastener constructed to threadingly engage the first leg; and wherein the cover plate includes an opening constructed to receive the fastener.

In still another refinement, first leg including an opening constructed to threadingly receive the threaded fastener, wherein the threaded fastener and the first leg are constructed to cooperate to deform the first leg to reduce the first gap and clamp the first portion of the deadfront between the first leg and the cover plate upon the application of a predetermined amount of torque to the threaded fastener.

In yet still another refinement, the first leg is electrically coupled to the cover plate and constructed to ground the cover plate with the first portion of the deadfront.

In a further refinement the first leg includes at least one protrusion extending therefrom and constructed to engage and ground the first leg with the first portion of the deadfront.

In a yet further refinement, the first leg is disposed adjacent to a first end of the cover plate; wherein the second leg is disposed adjacent to a second end of the cover plate opposite the first end; and wherein the wherein the first leg is longer than the second leg.

In a still further refinement, the deadfront has a wall thickness adjacent to the opening; and wherein the first gap and the second gap are constructed to receive the wall thickness.

Embodiments of the present invention include a loadcenter, comprising: a deadfront having an opening therein; and a filler plate, the filler plate including: a cover plate constructed to cover the opening; a first leg spaced apart from the cover plate to yield a first gap between the first leg and the cover plate, wherein the first gap is constructed to receive a first portion of the deadfront adjacent to the opening therein; and a second leg spaced apart from the cover plate to yield a second gap between the second leg and the cover plate, wherein the second gap is constructed to receive a second portion of the deadfront adjacent to the opening therein.

In a refinement, the first leg is constructed to deform and reduce the first gap and clamp the first portion of the deadfront between the first leg and the cover plate.

In another refinement, the loadcenter further comprises a fastener constructed to engage the first leg and to deform the first leg to reduce the first gap.

In yet another refinement, the fastener is a threaded fastener constructed to threadingly engage the first leg; and wherein the cover plate includes an opening constructed to receive the fastener.

In still another refinement, the threaded fastener and the first leg are constructed to engage each other and cooperate to deform the first leg to reduce the first gap and clamp the first portion of the deadfront between the first leg and the cover plate upon the application of a predetermined amount of torque to the threaded fastener.

In yet still another refinement, the filler plate includes a location feature constructed to position the cover plate over the opening; and wherein the location feature is constructed engage at least two sides of the opening to position the cover plate.

In a further refinement, the first leg is electrically coupled to the cover plate and constructed to ground the cover plate with the first portion of the deadfront.

In a yet further refinement, the first leg includes at least one protrusion extending therefrom and constructed to engage and ground the first leg with the first portion of the deadfront.

Embodiments of the present invention includes a method for covering an opening in a deadfront of a loadcenter, comprising: inserting a first leg into the opening, the first leg being coupled to a cover plate constructed to cover the opening, and the first leg being spaced apart from the cover plate to yield a first gap between the first leg and the cover plate; sliding the cover plate in a direction toward the first leg to receive a first portion of the deadfront adjacent to the opening within the first gap; inserting a second leg into the opening, the second leg being coupled to the cover plate, and the second leg spaced apart from the cover plate to yield a second gap between the second leg and the cover plate; sliding the cover plate in a direction toward the second leg to receive a second portion of the deadfront adjacent to the opening within the second gap; and clamping the first leg against the deadfront.

In a refinement, the method further comprises inserting a fastener into an opening in the cover plate and threading the fastener into an opening in the first leg; and applying torque to the threaded fastener to deform the first leg and clamp the first portion of the deadfront between the first leg and the cover plate.

In another refinement, the method further comprises driving at least one protrusion extending from the first leg into the first portion of the deadfront to ground the filler plate with the deadfront.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

What is claimed is:

1. A filler plate for a loadcenter having an opening in a deadfront, comprising:
    a cover plate constructed to cover the opening;
    a first leg coupled to and spaced apart from the cover plate to yield a first gap between the first leg and the cover plate, wherein the first gap is constructed to receive a first portion of the deadfront adjacent to the opening therein;
    a second leg coupled to and spaced apart from the cover plate to yield a second gap between the second leg and the cover plate, wherein the second gap is constructed to receive a second portion of the deadfront adjacent to the opening therein; and
    a location body configured for placement within the opening of the deadfront and constructed to position the cover plate over the opening, the first leg and the second leg extending from opposing ends of the location body, and wherein the location body abuts the cover plate.

2. The filler plate of claim 1, wherein the first leg is constructed to deform and reduce the first gap and clamp the first portion of the deadfront between the first leg and the cover plate, and wherein the location body has a width between a first side and an opposing second side of the location body that is sized to engage and fit between adjacent opposing sides of the opening.

3. The filler plate of claim 1, further comprising a fastener constructed to engage the first leg and to deform the first leg to reduce the first gap and clamp the first portion of the deadfront between the first leg and the cover plate, and wherein the location body has a width between a first side and an opposing second side of the location body that is configured for positioning the location body between a first side and a second side of the opening.

4. The filler plate of claim 3, wherein the fastener is a threaded fastener constructed to threadingly engage the first leg wherein the cover plate includes an opening constructed to receive the fastener; and wherein the width between the first side and the second side of the location body is between 0.25 mm and 1.5 mm smaller than a corresponding width between the first and second sides of the opening.

5. The filler plate of claim 4, the first leg including an opening constructed to threadingly receive the threaded fastener, wherein the threaded fastener and the first leg are constructed to cooperate to deform the first leg to reduce the first gap and clamp the first portion of the deadfront between the first leg and the cover plate upon the application of a predetermined amount of torque to the threaded fastener.

6. The filler plate of claim 1, wherein the first leg is electrically coupled to the cover plate and constructed to ground the cover plate with the first portion of the deadfront.

7. The filler plate of claim 6, wherein the first leg includes at least one protrusion extending therefrom and constructed to engage and ground the first leg with the first portion of the deadfront.

8. The filler plate of claim 1, wherein the first leg is disposed adjacent to a first end of the cover plate; wherein the second leg is disposed adjacent to a second end of the cover plate opposite the first end; and wherein the first leg is longer than the second leg.

9. The filler plate of claim 1, wherein the deadfront has a wall thickness adjacent to the opening; and wherein the first gap and the second gap are constructed to receive the wall thickness.

10. A loadcenter, comprising:
a deadfront having an opening therein; and
a filler plate, the filler plate including:
a cover plate constructed to cover the opening;
a first leg spaced apart from the cover plate to yield a first gap between the first leg and the cover plate, wherein the first gap is constructed to receive a first portion of the deadfront adjacent to the opening therein;
a second leg spaced apart from the cover plate to yield a second gap between the second leg and the cover plate, wherein the second gap is constructed to receive a second portion of the deadfront adjacent to the opening therein; and
a location body configured for placement within the opening of the deadfront, the first leg and the second leg extending from opposing ends of the location body, and wherein the location body has a width between a first side and an opposing second side of the location body that is configured for positioning the location body between a first side and a second side of the opening.

11. The loadcenter of claim 10, wherein the first leg is constructed to deform and reduce the first gap and clamp the first portion of the deadfront between the first leg and the cover plate, and wherein the location body has a width between a first side and an opposing second side of the location body that is sized to engage and fit between adjacent opposing sides of the opening.

12. The loadcenter of claim 11, further comprising a fastener constructed to engage the first leg and to deform the first leg to reduce the first gap, and wherein the location body abuts the cover plate.

13. The loadcenter of claim 12, wherein the fastener is a threaded fastener constructed to threadingly engage the first leg; and wherein the cover plate includes an opening constructed to receive the fastener.

14. The loadcenter of claim 13, wherein the threaded fastener and the first leg are constructed to engage each other and cooperate to deform the first leg to reduce the first gap and clamp the first portion of the deadfront between the first leg and the cover plate upon the application of a predetermined amount of torque to the threaded fastener.

15. The loadcenter of claim 10, wherein the filler plate includes a location feature constructed to position the cover plate over the opening; and wherein the location feature is constructed to engage at least two sides of the opening to position the cover plate.

16. The loadcenter of claim 10, wherein the first leg is electrically coupled to the cover plate and constructed to ground the cover plate with the first portion of the deadfront.

17. The loadcenter of claim 16, wherein the first leg includes at least one protrusion extending therefrom and constructed to engage and ground the first leg with an adjacent first surface of the first portion of the deadfront, a second surface of the first portion being adjacent to the cover plate, the first and second surfaces of the first portion being on opposing sides of the first portion of the deadfront.

18. A method for covering an opening in a deadfront of a loadcenter, comprising:
inserting a first leg into the opening, the first leg being coupled to a cover plate constructed to cover the opening, and the first leg being spaced apart from the cover plate to yield a first gap between the first leg and the cover plate;
sliding the cover plate in a direction toward the first leg to receive a first portion of the deadfront adjacent to the opening within the first gap;
inserting a second leg into the opening, the second leg being coupled to the cover plate, and the second leg spaced apart from the cover plate to yield a second gap between the second leg and the cover plate;
sliding the cover plate in a direction toward the second leg to receive a second portion of the deadfront adjacent to the opening within the second gap; and
clamping the first leg against the deadfront.

19. The method of claim 18, further comprising inserting a fastener into an opening in the cover plate and threading the fastener into an opening in the first leg; and
applying torque to the threaded fastener to deform the first leg and clamp the first portion of the deadfront between the first leg and the cover plate.

20. The method of claim 19, further comprising driving at least one protrusion extending from the first leg into the first portion of the deadfront to ground the filler plate with the deadfront.

* * * * *